United States Patent
Kunkel et al.

(10) Patent No.: US 8,478,093 B2
(45) Date of Patent: Jul. 2, 2013

(54) MULTIMODE INTERFERENCE COUPLER AND METHOD FOR THE STRUCTURAL CONFIGURATION THEREOF

(75) Inventors: Reinhard Kunkel, Grünheide (DE); Martin Schell, Berlin (DE); Inigo Molina-Fernandez, Málaga (ES); Gonzalo Wangümert Perez, Málaga (ES); Alejandro Ortega Monux, Málaga (ES)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 318 days.

(21) Appl. No.: 13/060,341

(22) PCT Filed: Aug. 28, 2009

(86) PCT No.: PCT/EP2009/061149
§ 371 (c)(1), (2), (4) Date: Mar. 25, 2011

(87) PCT Pub. No.: WO2010/023283
PCT Pub. Date: Mar. 4, 2010

(65) Prior Publication Data
US 2011/0164847 A1  Jul. 7, 2011

(30) Foreign Application Priority Data
Aug. 28, 2008 (DE) .......................... 10 2008 044 818

(51) Int. Cl.
*G02B 6/26* (2006.01)
*G02B 6/42* (2006.01)

(52) U.S. Cl.
USPC .................. 385/46; 385/15; 385/28; 385/31; 385/39; 385/47

(58) Field of Classification Search
USPC ............................................ 385/40
See application file for complete search history.

(56) References Cited

U.S. PATENT DOCUMENTS

| 5,410,625 | A | 4/1995 | Jenkins et al. | 385/28 |
| 5,689,597 | A | 11/1997 | Besse | 385/39 |

(Continued)

FOREIGN PATENT DOCUMENTS

| DE | 101 21 007 B4 | 4/2007 |
| DE | 603 15 599 T2 | 11/2007 |

(Continued)

OTHER PUBLICATIONS

El-Riffaey, Hatem H. et al., Rigorous Modal Analysis of Multi-mode Interference (MMI) Structures by Radiation Spectrum Method with Multiple Reflection, 1997, pp. 1-9, Elsevier Science B.V.

(Continued)

*Primary Examiner* — Rhonda Peace
(74) *Attorney, Agent, or Firm* — Brinks Hofer Gilson & Lione (57) ABSTRACT

A multimode interference coupler includes at least one supply waveguide and at least one output waveguide, wherein the coupler has along its longitudinal extent in the direction of the supply waveguide at least one longitudinal section in which the refractive index has a locally oscillating profile in a direction running substantially at right angles to the direction of the supply waveguide. A method for the structural configuration of such a multimode interference coupler.

20 Claims, 7 Drawing Sheets

U.S. PATENT DOCUMENTS

| | | | |
|---|---|---|---|
| 6,571,038 B1* | 5/2003 | Joyner et al. | 385/40 |
| 6,792,172 B1 | 9/2004 | Levy et al. | 385/15 |
| 6,922,509 B2 | 7/2005 | Hamada | 385/48 |
| 6,973,232 B2 | 12/2005 | Betty et al. | 385/29 |
| 7,072,542 B2 | 7/2006 | Jenkins et al. | 385/28 |
| 7,266,277 B2* | 9/2007 | Hamada | 385/129 |
| 7,397,977 B2 | 7/2008 | Hashimoto et al. | 385/14 |
| 2003/0002773 A1* | 1/2003 | Parker et al. | 385/15 |
| 2003/0091287 A1* | 5/2003 | Lam et al. | 385/40 |
| 2003/0152324 A1 | 8/2003 | Betty et al. | 385/29 |
| 2005/0008365 A1* | 1/2005 | Augustsson | 398/45 |
| 2005/0259935 A1* | 11/2005 | Hamada | 385/129 |
| 2006/0126992 A1 | 6/2006 | Hashimoto et al. | 385/14 |
| 2011/0164847 A1* | 7/2011 | Kunkel et al. | 385/28 |

FOREIGN PATENT DOCUMENTS

| | | |
|---|---|---|
| EP | 1 347 318 A2 | 9/2003 |
| EP | 1 818 699 A1 | 8/2007 |
| JP | 08-179168 | 7/1996 |
| WO | WO 03/016957 A2 | 2/2003 |

OTHER PUBLICATIONS

Huang, J. Z. et al., A New Design Approach to Large Input/Output Number Multimode Interference Couplers and its Application to Low-Crosstalk WDM Routers, Sep. 1998, pp. 1292-1294, vol. 10, No. 9, IEEE Photonics Technology Letters.

Kirkpatrick, S., Optimization by Simulated Annealing, May 13, 1983, pp. 671-680, vol. 220, No. 4598, American Association for the Advancement of Science.

Leuthold, Juerg et al., Multimode Interference Couplers with Tunable Power Splitting Ratios, May 2001, pp. 700-707, vol. 19, No. 5, Journal of Lightwave Technology.

De Merlier, Jan et al., Experimental Demonstration of All-Optical Regeneration Using an MMI-SOA, May 2002, pp. 660-662, vol. 14, No. 5, IEEE Photonics Technology Letters.

Molina-Fernandez, Inigo et al., Improving Multimode Interference Couplers Performance Through Index Profile Engineering, May 15, 2009, pp. 1307-1314, vol. 27, No. 10, Journal of Lightwave Technology.

Nagai, Shuichi et al., Multimode Interference Photonic Switches (MIPS), Apr. 2002, pp. 675-681, vol. 20, No. 4, Journal of Lightwave Technology.

Soldano, Lucas B., Optical Multi-mode Interference Devices Based on Self-Imaging: Principles and Applications, Apr. 1995, pp. 615-627, vol. 13, No. 4, Journal of Lightwave Technology.

Swillam, M. A. et al., Optimization of Optical Wide Band 3-dB MMI Splitter with Graded-Index Side Diffusions, 2004, pp. 633-637, IEEE Xplore.

Ulrich, R. et al., Resolution of Self-Images in Planar Optical Waveguides, May 1978, pp. 583-592, vol. 68, No. 5, J. Opt. Soc. Am.

Ulrich R. et al., Self-Imaging in Homogenous Planar Optical Waveguides, Sep. 1975, pp. 337-339, vol. 27, No. 6, Applied Physics Letters.

Vassallo, C., Optical Mode Solvers, 1997, pp. 95-114, Optical and Quantum Electronics.

Yin, Rui et al., Improved Approach to Low-Loss and High-Uniformity MMI Devices, 2000, pp. 317-321, Elsevier Science B.V.

Yin, Rui et al., Structure with Improved Self-Imaging in its Graded-Index Multimode Interference Region, Jun. 2002, vol. 19, No. 6, J. Opt. Soc. Am.

* cited by examiner

MULTIMODE INTERFERENCE COUPLER AND METHOD FOR THE STRUCTURAL CONFIGURATION THEREOF

BACKGROUND

The invention relates to a multimode interference coupler (MMI) having at least one supply waveguide and at least one output waveguide.

MMIs of the type mentioned at the outset comprise a waveguide in which a plurality of optical modes can be excited. At least one supply waveguide, usually a single-mode supply waveguide, supplies this waveguide with optical signals which excite the modes which are able to propagate in the MMI. If a plurality of the modes which are able to propagate are excited, they come to interfere inside the MMI. At least one maximum of the interference pattern is injected into an output waveguide, usually a single-mode output waveguide.

MMIs are used, in particular, in optical data transmission networks to divide optical signals from one supply waveguide, for example, among two or more output waveguides. For this purpose, the geometry and refractive index of the MMI are configured in such a manner that the desired field strength and phase angle of the output signals produced are achieved.

SUMMARY

The invention is based on the object of specifying a multimode interference coupler and a method for the structural configuration thereof, which has an improved uniform distribution of the outgoing signals. Another object of the invention is to specify a multimode interference coupler which has lower losses. Another object of the invention is to control the intensity distribution and the phase distribution of the modes which are able to propagate in an MMI in such a manner that low losses and a uniform intensity distribution are established in all output waveguides even in the case of MMIs having a multiplicity of outputs.

According to the invention, the objects are achieved by a multimode interference coupler (MMI) having at least one supply waveguide and at least one output waveguide, the multimode interference coupler having, along its longitudinal extent in the direction of the supply waveguide, at least one longitudinal section in which the refractive index has a locally oscillating profile in a direction running substantially at right angles to the direction of the supply waveguide.

The object is also achieved by a method for the structural configuration of a multimode interference coupler, in which the profile of the refractive index n(x) is determined, on the basis of the spatial coordinate x along the width of the multimode interference coupler, by the following equation:

$$n^2(x) = n_0^2(x) + \sum_{k=0}^{M-1} N_k \cdot \varphi_k(x),$$

where $n_0(x)$ denotes the refractive index of a known multimode interference coupler that is constant in sections, M is the number of modes which are able to propagate in the multimode interference coupler, $N_k$ are numerical coefficients and $\varphi_k(x)$ denotes a set of basic functions.

The invention recognized that, in the previously known MMIs, higher-order modes experience a lower effective refractive index than that required for an ideal behavior of the MMI. Therefore, the invention proposes modifying the refractive index of the MMI in a spatially dependent manner in such a way that higher-order modes experience a higher effective refractive index without disturbing the propagation of lower-order modes. In the sense of the present invention, an effective refractive index is understood in this case as meaning an average value of the refractive index experienced by the relevant modes along their propagation path.

It was also recognized that the refractive index profile proposed above can be achieved using small signal approximation in which interference is added to the refractive index of a known MMI that is constant in sections.

In this case, the interference is modeled by a sum of basic functions which may include, for example, trigonometric functions, rectangular functions, triangular functions, sawtooth functions or the like. In this case, each basic function is weighted with a numerical coefficient. The magnitude of this numerical coefficient depends on the selected basic functions and can be determined in an optimization method known per se.

In some embodiments of the invention, optimization is carried out in this case in such a manner that a desired target profile of the optical intensity is compared with the calculated profile and the parameters $N_k$ are adapted until the discrepancies have undershot a predefinable limit. The refractive index profile obtained in this manner is substantially independent of the choice of basic functions. However, the latter influence the convergence behavior of the calculation of the coefficients $N_k$ and the representation of the refractive index profile.

The refractive index profile calculated using the method proposed according to the invention usually has an oscillating or meandering profile in the region of the multimode waveguide. In this case, the distance between adjacent maxima or minima is usually between 50 nm and 400 nm. In this case, the distance between adjacent minima or adjacent maxima depends, in particular, on the geometrical dimensions of the MMI, the wavelength of the radiated light and the desired interference image.

It has also been shown that the interference image is favorably influenced if the profile of the refractive index does not form any sharp edges at the edges of the MMI toward the surrounding material but rather the refractive index gradually falls to the value of the surrounding material. The refractive index profile obtained using the method proposed according to the invention cannot usually be represented by a closed analytical function.

It has been shown that an effective refractive index, which, for the modes which are able to propagate, decreases in a substantially quadratic manner with the number of modes, is produced inside the MMI by using the proposed method for producing a refractive index profile of an MMI. In this case, in some embodiments of the invention, the effective refractive index $n_{\it{eff}}$ of a real MMI may differ from the calculated behavior on account of manufacturing tolerances. Nevertheless, the effective refractive index $n_{\it{eff}}$ for the modes which are able to propagate always exhibits better approximation to the ideal quadratic behavior than when using a known refractive index profile which is constant in sections.

The refractive index profile according to the invention reduces the losses produced between the radiated optical power and the optical power coupled out of the MMI. In this case, an ideal MMI may also have losses; in the sense of the present invention, only those losses which additionally occur in the MMI on account of the non-ideal field distribution are therefore referred to as losses.

In one refinement of the invention, the basic functions $\phi_k(x)$ describe the field distribution of the excitable modes in the multimode interference coupler with the refractive index $n_0(x)$. It has been found that it is possible to determine the numerical coefficients $n_k$ for these basic functions in a particularly simple manner.

In some refinements of invention, the basic functions of only a sub-selection of modes which are able to propagate, rather than of all the modes which are able to propagate, are taken into account when optimizing the refractive index profile. This sub-selection may include, for example, those modes which are excited more strongly than a predefinable limit value by the respective signal from the supply waveguide. This both accelerates the convergence of the calculation and improves the quality of the index profile n(x) obtained.

The invention shall be explained in more detail below using exemplary embodiments and figures without restricting the general concept of the invention.

DESCRIPTION OF PREFERRED EMBODIMENTS

Figure 1:
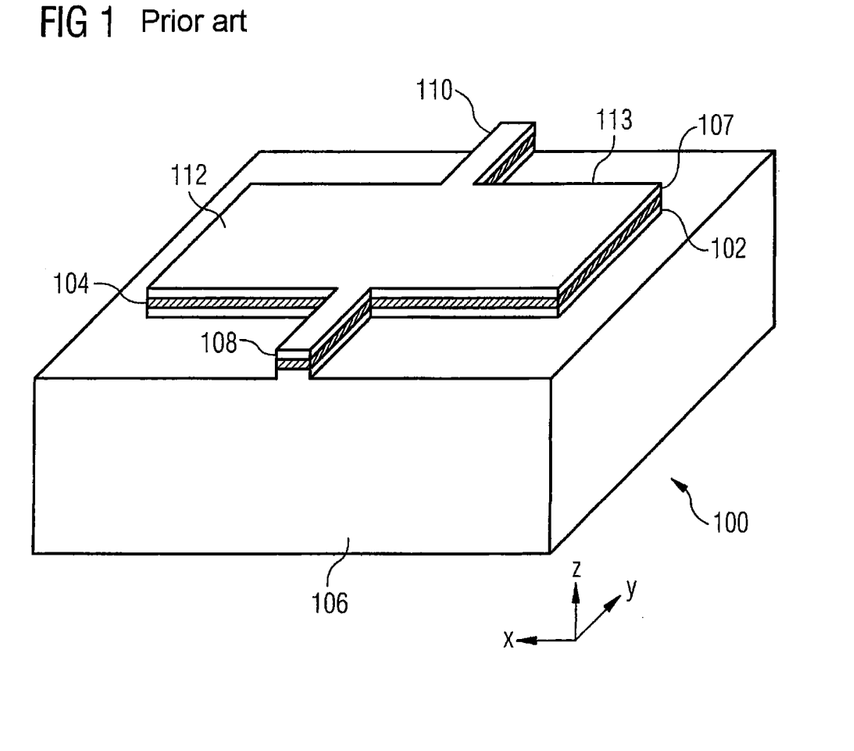
FIG. 1 shows the diagrammatic structure of a known multimode interference coupler using the example of a 1×1 MMI.

FIG. 1 shows one exemplary embodiment of a known multimode interference coupler 100. The MMI 100 is arranged on a substrate 106. In this case, the substrate 106 may comprise a semiconductor substrate or a glass substrate, for example. A semiconductor substrate may contain, in particular, silicon and/or group III nitrides and/or a ternary or quaternary compound of elements from main group III and V and/or elements from main group II and VI. In this case, the substrate 106 may consist of a single compound or of a plurality of layers arranged on top of one another. The substrate may comprise lateral structuring. Further electronic and/or optical components may be arranged on the substrate.

The MMI comprises an active layer 104 which optionally adjoins a covering layer 107 and an intermediate layer 102. In this case, the covering layer 107 and the intermediate layer 102 have, in particular, the task of providing a discontinuous refractive index profile in a direction z perpendicular to the surface of the substrate 106, such that light propagating in the active layer 104 is totally internally reflected and cannot leave the layer 104 toward the top or bottom. The layer thickness of the active layer 104 is selected in this case in such a manner that only one mode is excited along the z axis.

In addition, the covering layer 107 may be designed to provide an inert surface in order to prevent the MMI 100 from being destroyed as a result of reacting with the surrounding atmosphere. The intermediate layer 102 may be additionally designed to adapt the lattice constants, to improve the adhesion of the layer 104 to the substrate 106 and/or may be designed as an etching stop layer.

The layer 104 may be produced, in particular, from a semiconductor material, a polymer or glass. The refractive index of the layer 104 can be set by changing the chemical composition and/or by means of doping.

The layer 104 has lateral structuring. This produces at least one supply waveguide 108 and at least one output waveguide 110. A broader section 112, in which a plurality of modes which are able to propagate can be excited and brought to interference, is situated between the supply waveguide 108 and the output waveguide 110.

The layer 104 is designed in the region of the waveguides 108 and 110 and in the section 112 in such a manner that light guided inside the layer 104 cannot laterally leave the layer 104 in the x-y plane. In the exemplary embodiment illustrated, this is achieved by virtue of the layer 104 being surrounded by air which has a lower refractive index than the material of the layer 104. In further embodiments of the invention, the layer 104 may also be surrounded by another material in the x-y plane.

During operation of the MMI, a plurality of modes in the region 112 are excited by the light wave which is injected using the waveguide 108. Said modes come to interfere and form an interference image in the output plane 113. Part of this interference pattern excites a single-mode output wave in the output waveguide 110.

The example shown in FIG. 1 has one supply waveguide 108 and one output waveguide 110. The exemplary embodiment shown is therefore referred to as a 1×1 MMI. MMIs may occasionally also have a plurality of supply and/or output waveguides. For example, 2×2 MMIs, 1×4 MMIs, 1×2 MMIs, 2×4 MMIs or 1×10 MMIs are customary.

The MMI 100 according to FIG. 1 may be part of an integrated circuit which comprises further optical and/or electronic components.

Figure 2:
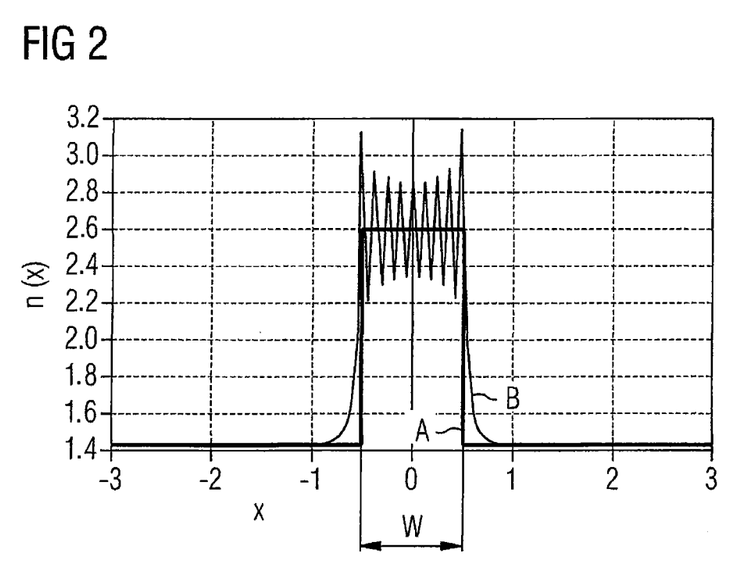
FIG. 2 shows the profile of the refractive index of a known 1×1 MMI and of a 1×1 MMI according to the present invention.

FIG. 2 shows the refractive index n(x) of an MMI on the ordinate and a spatial coordinate x on the abscissa in a direction running substantially perpendicular to the direction of the supply waveguide 108. In the illustration selected in FIGS. 2-13, the spatial coordinate x is standardized to the geometrical width W of a previously known MMI with the refractive index $n_0(x)$. In this case, FIG. 2 illustrates the profile of the refractive index at least in one section of the region 112 of the MMI 100. In some embodiments of the invention, the refractive index profile illustrated is established over the entire propagation direction y of the region 112.

The curve designated A illustrates the profile of the refractive index $n_0(x)$ of a known MMI. The refractive index profile according to A is constant in sections. This means that a first refractive index $n_0$, 2.6 in the example illustrated, prevails in the region 112 of the MMI with the width W. A material having a second refractive index, 1.44 in the exemplary embodiment, is arranged to the right and to the left of the region 112.

The invention now proposes configuring the refractive index n(x) as illustrated in curve B. The index profile optimized according to curve B has an alternating profile in the waveguide core, the amplitude between minima and maxima being smallest in the center of the waveguide. Outside the region 112, the refractive index is somewhat raised in an edge layer toward the surrounding material.

In this case, the distance between two adjacent maxima or two adjacent minima is approximately 50 nm to approximately 400 nm. This distance is dependent on the wavelength and the geometrical dimensions of the region 112. It is approximately 10% to approximately 50% of the wavelength of the radiation guided in the supply waveguide 108.

Figure 3:
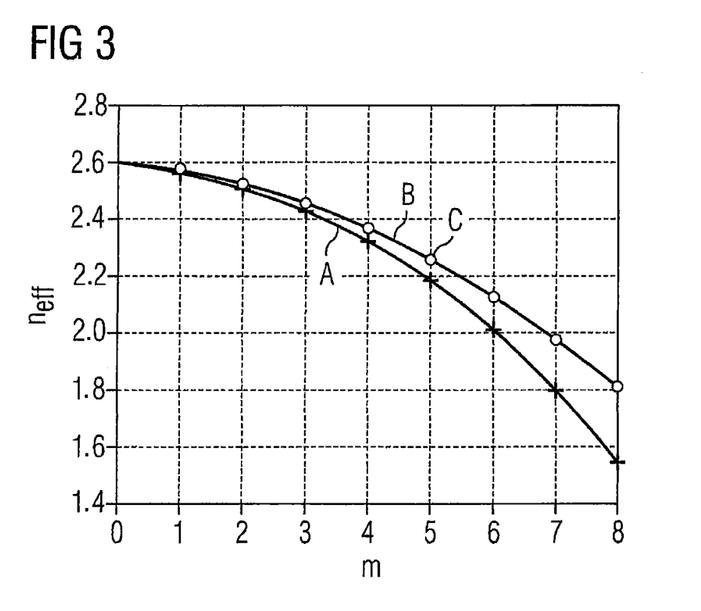
FIG. 3 shows the effective refractive index of the known 1×1 MMI and of the 1×1 MMI according to the present invention on the basis of the number of modes.

FIG. 3 shows the effects of the refractive index profile according to FIG. 2 on the modes which are able to propagate. In this case, in FIG. 3 shows the effective refractive index $n_{eff}$. The number of modes m is plotted on the abscissa. In this case, the effective refractive index $n_{eff}$ is the average refractive index of the material in which the corresponding mode propagates. The effective refractive index $n_{eff}$ is therefore influenced by local or temporal inhomogeneities in the refractive index n(x).

In the case of a conventional waveguide with a refractive index $(n(x)=n_0)$ which is constant in sections, the effective refractive index $n_{eff}$ of the respective mode is $$n_{eff} = n_0 \cdot \sqrt{1 - \frac{1}{2} \cdot \frac{(m+1)^2}{W_{em}}},$$

where $W_{em}$ is the effective width of the region 112 of the MMI 100 that is standardized to the wavelength of the respective mode, $n_0$ is the constant refractive index of a stepped or box-shaped refractive index profile of a conventional MMI and m denotes the respective number of modes. This law is illustrated as curve A in FIG. 3.

It was possible to show that the imaging properties of an MMI 100 are considerably improved if the following applies to the effective refractive index $n_{eff}$:

$$n_{eff,m} = n_0 \cdot \left(1 - \frac{1}{2} \cdot \frac{(m+1)^2}{W_n}\right),$$

where $W_n$ is the effective width of the region 112 of the MMI 100 which is standardized to the wavelength of the fundamental mode. The law illustrated above is illustrated as curve B in FIG. 3. In the sense of the present invention, the effective width is understood in this case as meaning the width experienced by the modes which are able to propagate along their propagation path. This may be broader than the geometrical width W.

FIG. 3 shows that a profile of the effective refractive index according to curve A, which applies to a conventional MMI, differs from the inventive profile of the effective refractive index according to curve B. The magnitude of the difference increases with a greater number of modes m, with the result that these modes make only an incomplete contribution to the interference image in the output plane in a conventional MMI.

FIG. 3 also shows calculated values C (circles) for the effective refractive index of the first eight modes in an inventive waveguide having a refractive index profile according to FIG. 2, curve B. As is clear from FIG. 3, the calculated values C no longer differ from the optimum curve profile B.

In some embodiments, measured values for the points C according to FIG. 3 may differ in this case from the ideal profile B according to FIG. 3 on account of manufacturing tolerances when implementing the refractive index profile B according to FIG. 2. Nevertheless, the effective refractive index profile implemented approximates the ideal profile in an improved manner in comparison with the previously used MMIs.

Figure 4:
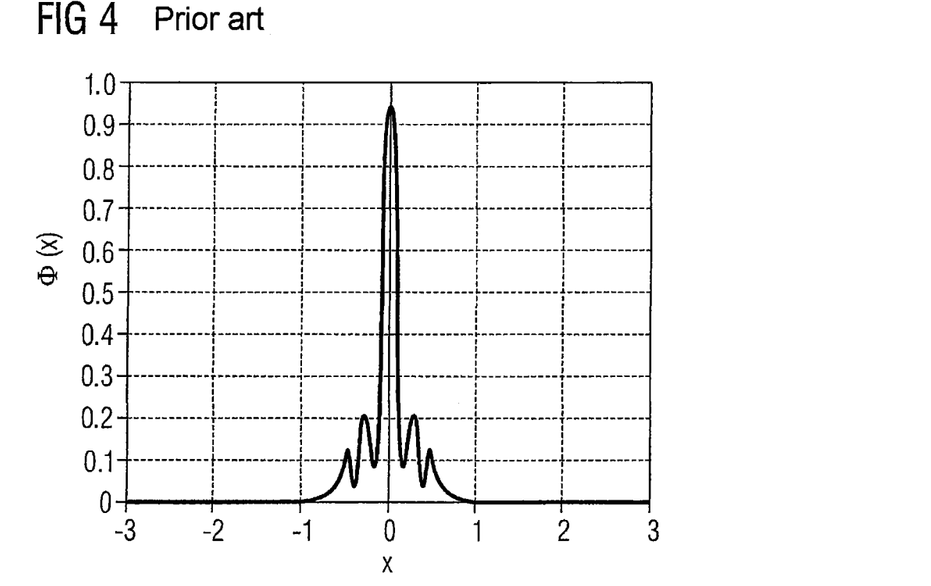
FIG. 4 shows the lateral profile of the field strength in the output plane of a known 1×1 MMI.

FIG. 4 shows the lateral profile of the field strength $\Phi(x)$ in the output plane 113 of the region 112 for the known 1×1 MMI illustrated in FIG. 1. It is clear from FIG. 4 that the profile of the effective refractive index according to curve A in FIG. 3 results in higher-order modes not making an optimum contribution to the production of the interference image in the output plane 113. Secondary maxima which cannot be injected into the output waveguide 110 at the point x=0 therefore form on both sides of the main maximum. The field strength of the output signal from the MMI 100 is therefore lower than the field strength of the input signal. In addition, the phase relationship between the output signal and the input signal can be adversely affected in an undesirable manner.

Figure 5:
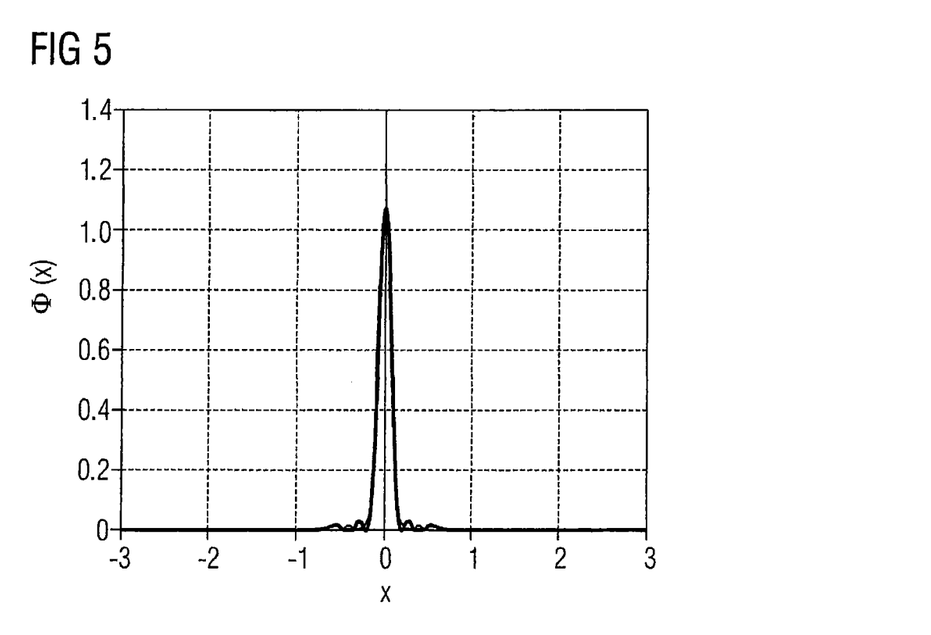
FIG. 5 shows the lateral profile of the field strength in the output plane of a 1×1 MMI according to one exemplary embodiment of the present invention.

FIG. 5 shows the lateral profile of the field strength $\Phi(x)$ in the output plane 113 for an MMI having a refractive index profile according to the invention. As is clear from FIG. 5, the field strength of the main maximum increases at the expense of the secondary maxima. A greater output power is thus available in the output waveguide 110 in the MMI proposed according to the invention.

Figure 6:
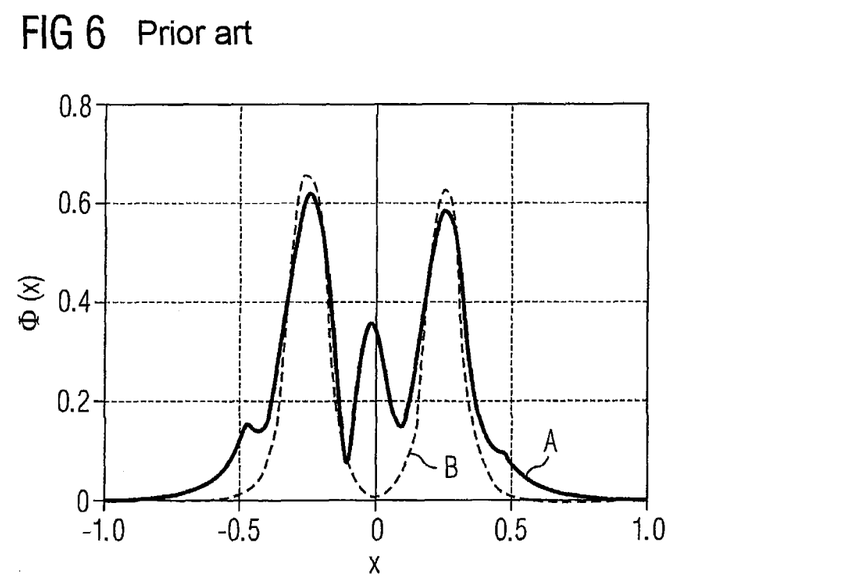
FIG. 6 shows the lateral profile of the field strength in the output waveguides of a 2×2 MMI as well as the profile of the field strength in the output plane for a conventional MMI.
Figure 7:
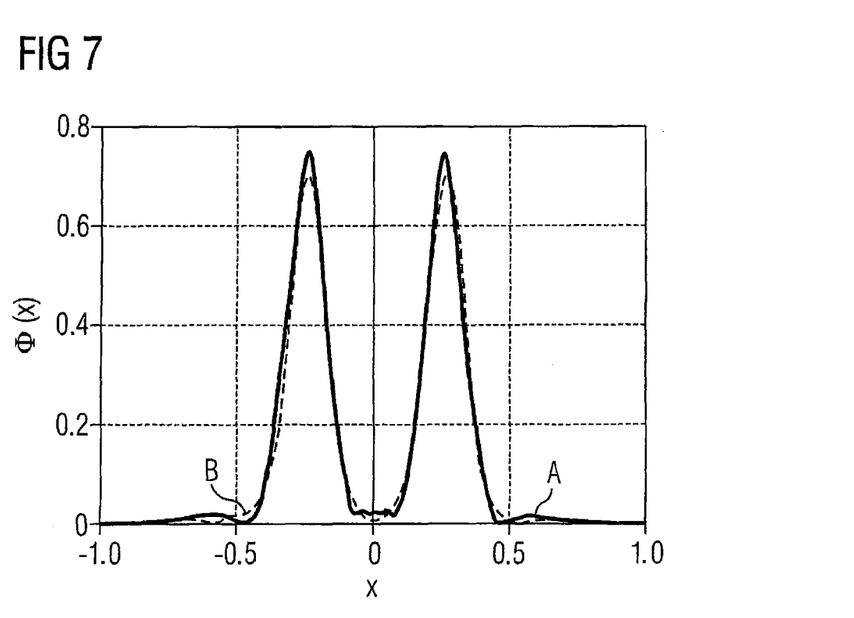
FIG. 7 shows the lateral profile of the field strength in the output waveguides of a 2×2 MMI as well as the profile of the field strength in the output plane according to one exemplary embodiment of the present invention.

FIGS. 6 and 7 show the lateral profile of the field strength $\Phi(x)$ in two outgoing waveguides (curve B) and in the output plane 113 (curve A) of a 2×2 MMI. In this case, the two MMIs have the same geometrical structure. The results illustrated in FIG. 6 apply to a known MMI, that is to say to an MMI having a refractive index profile according to curve A in FIG. 2.

It is clear from FIG. 6 that the field strength $\Phi(x)$ in the output plane 113 of the MMI 100 according to curve A has, as desired, two main maxima which are approximately at the position of the output waveguides 110. A secondary maximum which reaches approximately ⅔ of the field strength of the main maxima is located between the two main maxima. Toward the edge of the MMI, the field strength falls in a flatter manner than the local acceptance of the output waveguide 110. In this manner, approximately ⅓ of the optical power in the output plane 113 cannot be injected into the output waveguides 110. Furthermore, the optical power injected into the two waveguides differs by approximately 0.4 dB.

In contrast to this, FIG. 7 shows the field strength profile $\Phi(x)$ for an MMI having a refractive index profile proposed according to the invention. It is clear from curve A in FIG. 7 that the field strength of the main maxima increases in the output plane upon reducing the field strength of the secondary maxima on account of the refractive index profile proposed according to the invention. The field strength in the output plane (curve A) and the field strength in the output waveguide (curve B) are virtually congruent. This means that the radiated optical power is injected almost completely into the output waveguides 110. The losses in the MMI are therefore lower at less than 0.1 dB. In addition, the difference between the field strengths injected into the two waveguides is negligible. The MMI proposed according to the invention thus allows an improved beam splitter.

Figure 8:
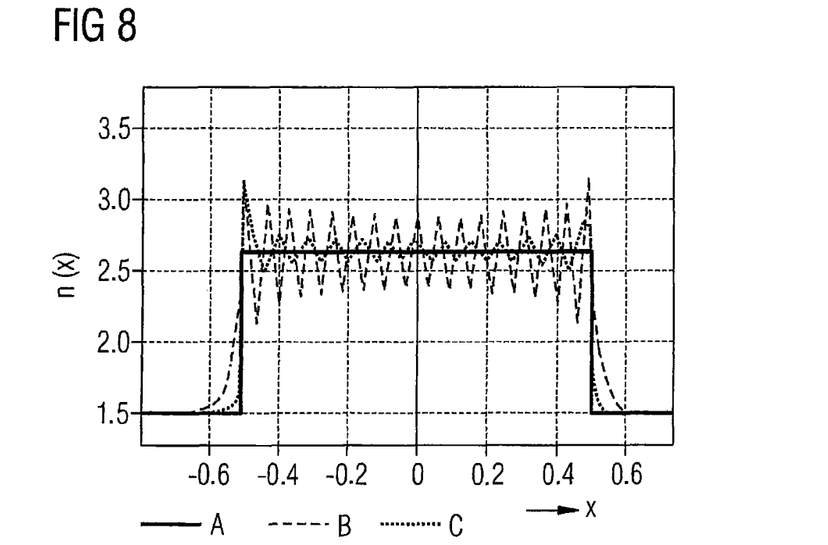
FIG. 8 shows the profile of the refractive index inside a 1×4 MMI for a known MMI and according to two different embodiments of the present invention.
Figure 9:
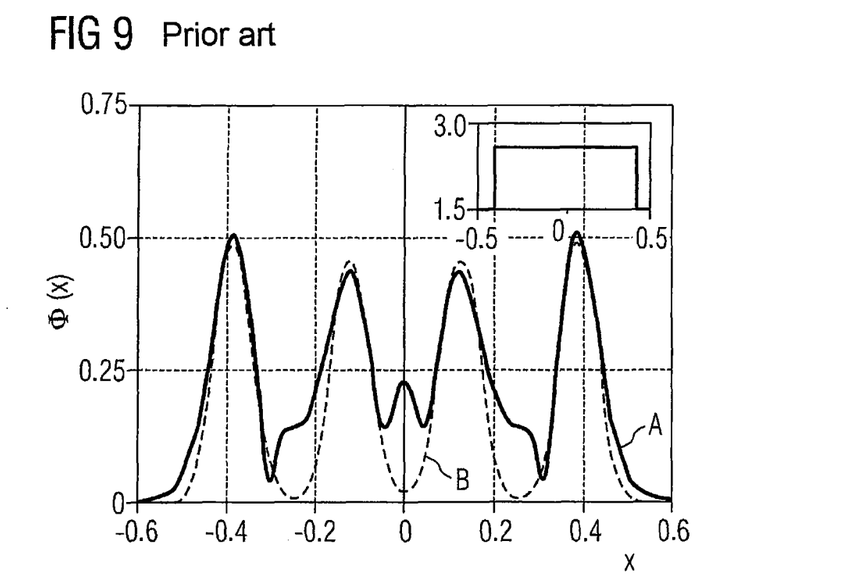
FIG. 9 shows the lateral profile of the field strength in the output plane and in the output waveguides of a previously known 1×4 MMI.

FIG. 8 shows three different possible profiles of the refractive index n(x) for a 1×4 MMI with a width of 6 μm. In this case, the solid line A shows the refractive index profile of a known MMI. The associated interference image in the output plane of such an MMI is illustrated in FIG. 9.

Figure 10:
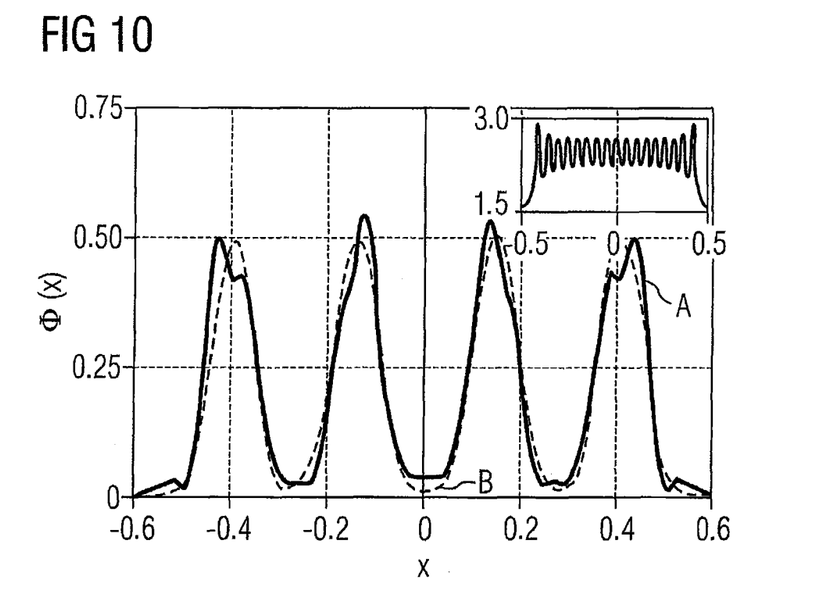
FIG. 10 shows the lateral profile of the field strength in the output plane and in the output waveguides of a 1×4 MMI according to one exemplary embodiment of the present invention.

The line B illustrated using dashed lines shows the refractive index profile in one embodiment of the present invention. The refractive index B can be obtained by taking into account all modes which are able to propagate in the MMI as basic functions for calculating the refractive index profile. The interference image in the output plane of this MMI is illustrated in FIG. 10.

In addition, FIG. 8 shows a further profile of the refractive index according to another embodiment of the present invention as a dotted line C. This profile of the refractive index can be obtained by including, in the calculation, only those basic functions which indicate the field strength distribution of modes which are able to propagate and are excited by the field of the supply waveguide to an extent above a predefinable limit value.

Figure 11:
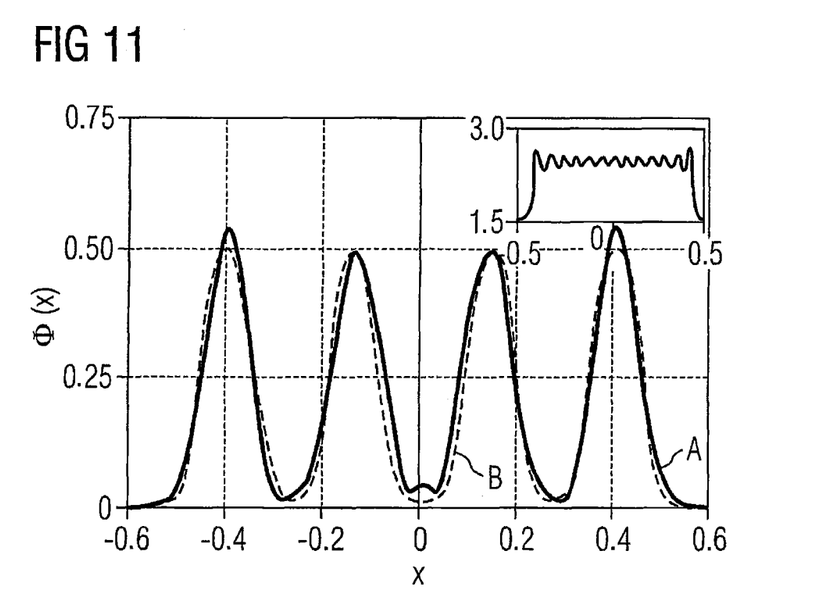
FIG. 11 shows the lateral profile of the field strength in the output plane and in the output waveguides of a 1×4 MMI according to another exemplary embodiment of the present invention.

The practice of taking into account a sub-selection of modes which are able to propagate instead of all modes which are able to propagate results firstly in faster convergence of the proposed calculation method. Furthermore, the fluctuations of the refractive index and the amplitude of the resultant meanders are reduced. This makes it possible to reduce the manufacturing complexity. The interference image in the output plane of this MMI is illustrated in FIG. 11.

Curve A in FIG. 9 shows the lateral profile of the field strength $\Phi(x)$ in the output plane 113 of a known 1×4 MMI 100. The output power in the four output waveguides of the MMI is illustrated as curve B. The profile of the refractive index n(x) along the width of the MMI is constant in sections, as shown by the inserted curve profile in FIG. 9.

The lateral profile of the field strength $\Phi(x)$ in the output plane shows four main maxima, as desired, but secondary maxima in between. The latter result in a loss of intensity. Furthermore, the field strength distribution between the main maxima is different, with the result that the known MMI divides the input power among four identical output waveguides only in an incomplete manner. The invention recognized that the interference pattern according to FIG. 9 has, in particular, deficits because higher-order modes have a phase error on account of the differing effective refractive index and therefore cannot properly contribute to the production of the interference pattern. This results in a loss of 0.5 dB and a disrupted equilibrium between the output waveguides of 0.6 dB (curve B).

FIG. 10 in turn shows the interference pattern in the output plane as curve A and the power injected into the output waveguides as curve B. The MMI according to FIG. 10 has the refractive index profile proposed according to the invention according to curve B in FIG. 8, as is illustrated again in the inserted curve profile in FIG. 10.

The interference pattern in the output plane according to FIG. 10 consequently exhibits a more uniform profile of the field strength of all four main maxima. The secondary maxima, which deprive part of the optical power of use, are present only in attenuated form in the interference pattern in FIG. 10. The MMI according to the invention thus has a loss of 0.15 dB and a disrupted equilibrium between the output waveguides of 0.1 dB.

FIG. 11 in turn shows the interference pattern in the output plane as curve A and the power injected into the output waveguides as curve B. The MMI according to FIG. 11 has the refractive index profile proposed according to the invention according to curve C in FIG. 8, as is illustrated again in the inserted curve profile in FIG. 11.

It has surprisingly been shown that an improved signal quality in the output waveguides 110 can nevertheless be obtained by means of a simpler refractive index profile which can be obtained in a shorter calculation method and can be implemented with less complexity. The additional loss between the input power and the output power of the 1×4 MMI illustrated is thus only 0.1 dB in the case of the exemplary embodiment according to FIG. 11. In this case, the maximum field strength in the inner waveguides is 0.12 dB lower than that in the outer waveguides.

Figure 12:
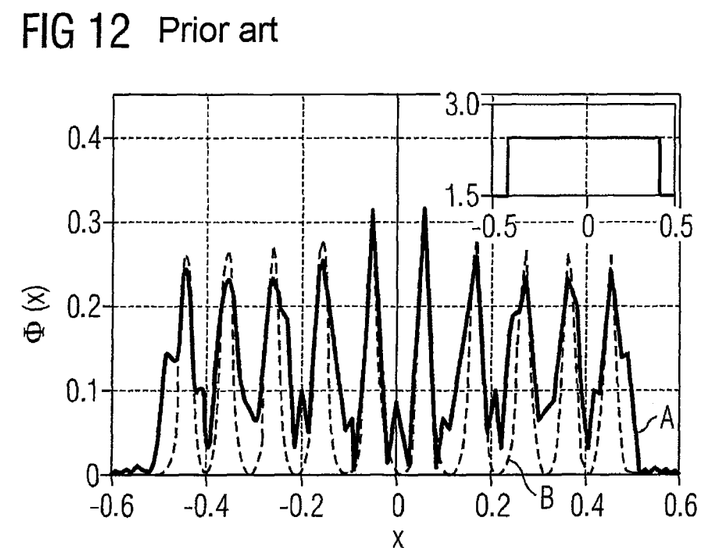
FIG. 12 shows the lateral profile of the field strength in the output waveguides and in the output plane of a known 1×10 MMI.
Figure 13:
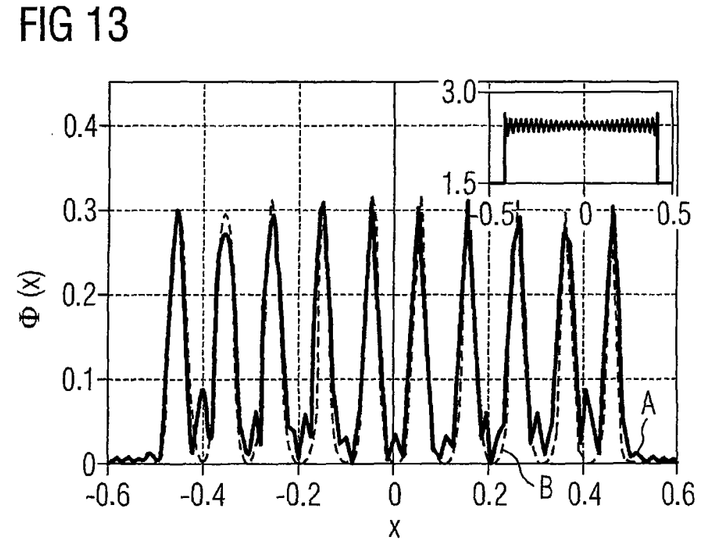
FIG. 13 shows the lateral profile of the field strength in the output waveguides and in the output plane of a 1×10 MMI according to one exemplary embodiment of the present invention.

FIGS. 12 and 13 finally show another exemplary embodiment of the MMI according to the invention. The field strength profile $\Phi(x)$ of a 1×10 MMI which divides the optical signal from a supply waveguide among ten output waveguides is illustrated. The interference region 112 required for this purpose has a width of 20 μm with a refractive index of $n_0=1.440$.

FIG. 12 in turn shows the profile of the field strength in the output plane (curve A) and in the output waveguides (curve B) for a known 1×10 MMI with a refractive index which is constant in sections, as is illustrated in the inserted curve profile in FIG. 12. The multiplicity of excited modes required by an interference pattern with 10 main maxima imposes great demands on the transmission behavior of the MMI in this case. These demands are only incompletely met by the known MMI. The sum of the output powers of the output waveguides is thus 1.16 dB lower than the injected power in the supply waveguide. The difference between the output waveguides with the strongest excitation and the output waveguides with the weakest excitation is 1.7 dB. Both the non-uniformity of the interference pattern and the high losses of the component are due to extensive secondary maxima which are established on account of the non-ideal propagation of higher-order modes in the waveguide.

By comparison, FIG. 13 shows the interference pattern in the output plane as curve A and the power injected into the output waveguides as curve B. The MMI according to FIG. 13 has the refractive index profile proposed according to the invention, as illustrated in the inserted curve profile in FIG. 13.

In this case, it is clear from FIG. 13 that the secondary maxima have decreased considerably. The loss of the 1×10 MMI according to the invention accordingly reaches a value of 0.28 dB. The excitation uniformity in the output waveguides is also increased as desired. The difference between the output waveguides with the strongest excitation and the output waveguides with the weakest excitation is only 0.42 dB.

It goes without saying that the invention is not restricted to the exemplary embodiments illustrated. Rather, modifications and changes can be made when implementing the invention without substantially changing the invention per se. Therefore, the description above should not be considered to be restrictive but rather should be considered to be explanatory. The claims below should be understood in such a manner that a feature mentioned is present in at least one embodiment of the invention. This does not exclude the presence of further features.

The invention claimed is:

1. A multimode interference coupler having
   at least one supply waveguide,
   at least one output waveguide, and
   at least one interference section which is coupled to the at least one supply waveguide and the at least one output waveguide, wherein
   the refractive index of said interference section has an oscillating profile in a direction running substantially perpendicular to the direction of the supply waveguide, and wherein
   the effective refractive index $n_{eff}$ of the modes being able to propagate inside said interference section decreases in an approximately quadratic manner with the mode number.

2. The multimode interference coupler according to claim 1, wherein the refractive index n(x) can be described by the following equation:

$$n^2(x) = n_0^2(x) + \sum_{k=0}^{M-1} N_k \cdot \varphi_k(x),$$

where x denotes the spatial coordinate in a direction running substantially perpendicular to the direction of the supply waveguide, $n_0(x)$ denotes the refractive index of a known multimode interference coupler, M is the mode number of the mode being able to propagate inside the at least one interference section, $N_k$ are numerical coefficients and $\varphi_k(x)$ denotes a set of base functions.

3. The multimode interference coupler according to claim 2, wherein the basic functions $\varphi_k(x)$ describe the field distribution of the modes inside the interference section of a multimode interference coupler with the refractive index $n_0(x)$.

4. The multimode interference coupler according to claim 1, wherein maximum and minimum values of the refractive index profile are variable, wherein the maximum and minimum values increase from the center of the interference section towards its edge, and wherein two adjacent maxima or minima of the oscillating profile of the refractive index are spaced 50 nm up to 400 nm apart from each other.

5. The multimode interference coupler according to claim 1, having
   two supply waveguides, and
   any of two or four output waveguides.

6. The multimode interference coupler according to claim 1, having
   exactly one supply waveguide, and
   any of two, four or ten output waveguides.

7. The multimode interference coupler according to claim 1, wherein two adjacent maxima or minima of the oscillating profile of the refractive index are spaced 50 nm up to 400 nm apart from each other.

8. The multimode interference coupler according to claim 1, wherein the at least one supply waveguide, the at least one output waveguide, and the at least one interference section are formed from a laterally structured layer.

9. A multimode interference coupler having
   at least one supply waveguide,
   at least one output waveguide, and
   at least one interference section which is coupled to the at least one supply waveguide and the at least one output waveguide, wherein
   the refractive index of said interference section has an oscillating profile in a direction running substantially perpendicular to the direction of the supply waveguide, wherein
   maximum and minimum values of the oscillating refractive index profile are variable, and
   wherein the maximum and minimum values increase from the center of the interference section towards its edge.

10. The multimode interference coupler according to claim 9, wherein the effective refractive index $n_{eff}$ of the modes being able to propagate inside said interference section decreases in an approximately quadratic manner with the mode number.

11. The multimode interference coupler according to claim 9, wherein the refractive index n(x) can be described by the following equation:

$$n^2(x) = n_0^2(x) + \sum_{k=0}^{M-1} N_k \cdot \varphi_k(x),$$

where x denotes the spatial coordinate in a direction running substantially perpendicular to the direction of the supply waveguide, $n_0(x)$ denotes the refractive index of a known multimode interference coupler, M is the mode number of the mode being able to propagate inside the at least one interference section, $N_k$ are numerical coefficients and $\varphi_k(x)$ denotes a set of base functions.

12. The multimode interference coupler according to claim 11, wherein the basic functions $\varphi_k(x)$ describe the field distribution of the modes inside the interference section of a multimode interference coupler with the refractive index $n_0(x)$.

13. The multimode interference coupler according to claim 9, having
    exactly two supply waveguides, and
    any of two or four output waveguides.

14. The multimode interference coupler according to claim 9, having
    exactly one supply waveguide, and
    any of two, four or ten output waveguides.

15. The multimode interference coupler according to claim 9, wherein two adjacent maxima or minima of the oscillating profile of the refractive index are spaced 50 nm up to 400 nm apart from each other.

16. A method for the structural configuration of a multimode interference coupler, said coupler having
    at least one supply waveguide,
    at least one output waveguide, and
    at least one interference section which is coupled to the at least one supply waveguide and the at least one output waveguide, wherein
    the profile of the refractive index n(x) is determined by solving the following equation:

$$n^2(x) = n_0^2(x) + \sum_{k=0}^{M-1} N_k \cdot \varphi_k(x),$$

where x denotes the spatial coordinate in a direction running substantially perpendicular to the direction of the supply waveguide, $n_0(x)$ denotes the refractive index of a known multimode interference coupler, M is the mode number of the mode being able to propagate inside the at least one interference section, $N_k$ are numerical coefficients and $\varphi_k(x)$ denotes a set of base functions.

17. The method according to claim 16, wherein the basic functions $\varphi_k(x)$ describe the field distribution of the modes which are able to propagate in the multimode interference coupler with the refractive index $n_0(x)$.

18. The method according to claim 16, wherein the coefficients $N_k$ are determined in such a manner that the effective refractive index $n_{eff}$ for the modes which are able to propagate decreases in a quadratic manner with the number of modes.

19. The method according to claim 16, wherein only a sub-set of the M modes which are able to propagate in said interference section is included in the calculation.

20. The method according to claim 16, wherein the numerical coefficients $N_k$ are determined using any of a rigorous-mode solving method or a simulated annealing method.

* * * * *

UNITED STATES PATENT AND TRADEMARK OFFICE
CERTIFICATE OF CORRECTION

PATENT NO. : 8,478,093 B2
APPLICATION NO. : 13/060341
DATED : July 2, 2013
INVENTOR(S) : Kunkel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 345 days.

Signed and Sealed this
Eighth Day of September, 2015

Michelle K. Lee
*Director of the United States Patent and Trademark Office*